Sept. 7, 1926.  H. F. SKILLINGS  1,599,374
GRINDING MACHINE
Filed April 28, 1924   2 Sheets-Sheet 1

Inventor:
Harold F. Skillings.
by Emery, Booth, Janney & Varney
Attys.

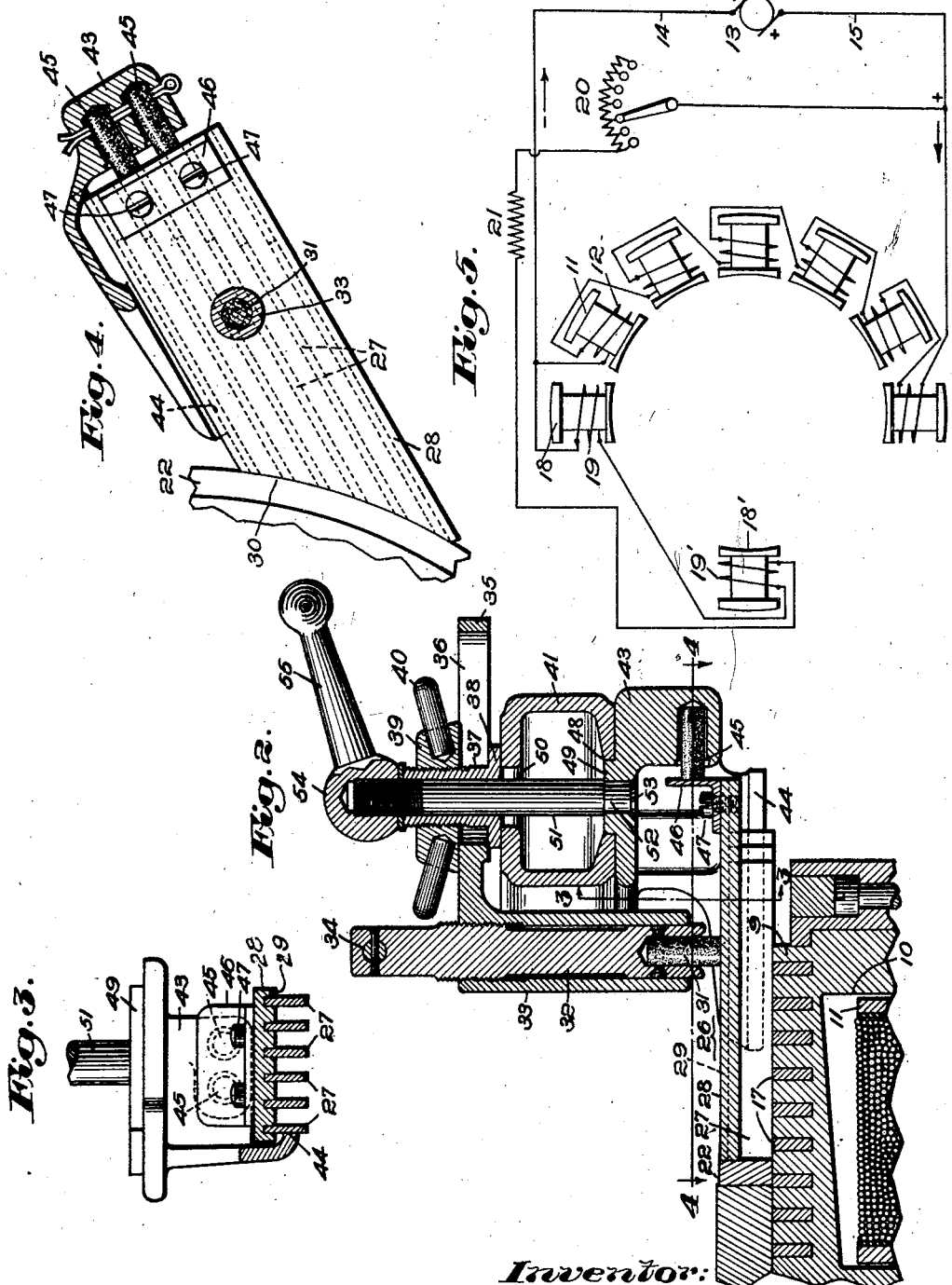

Patented Sept. 7, 1926.

1,599,374

UNITED STATES PATENT OFFICE.

HAROLD F. SKILLINGS, OF ALLSTON, MASSACHUSETTS, ASSIGNOR TO THE BLANCHARD MACHINE COMPANY, OF CAMBRIDGE, MASSACHUSETTS, A CORPORATION OF MASSACHUSETTS.

GRINDING MACHINE.

Application filed April 28, 1924. Serial No. 709,324.

This invention relates to a novel and improved means for removing the detritus from the rotating work support of a grinding machine of the class in which a reduction of the work pieces is effected by a single pass across the grinding wheel.

The invention will be best understood by reference to the following description, when taken in connection with the accompanying drawings of one specific embodiment thereof, while its scope will be more particularly pointed out in the appended claims.

In the drawings:

Fig. 2 is a sectional view on an enlarged scale on line 2—2 of Fig. 1;

Fig. 3 is a sectional view on line 3—3 of Fig. 2;

Fig. 4 is a sectional view on line 4—4 of Fig. 2; and

Fig. 5 is a diagrammatic view of the electrical system.

Figure 1:
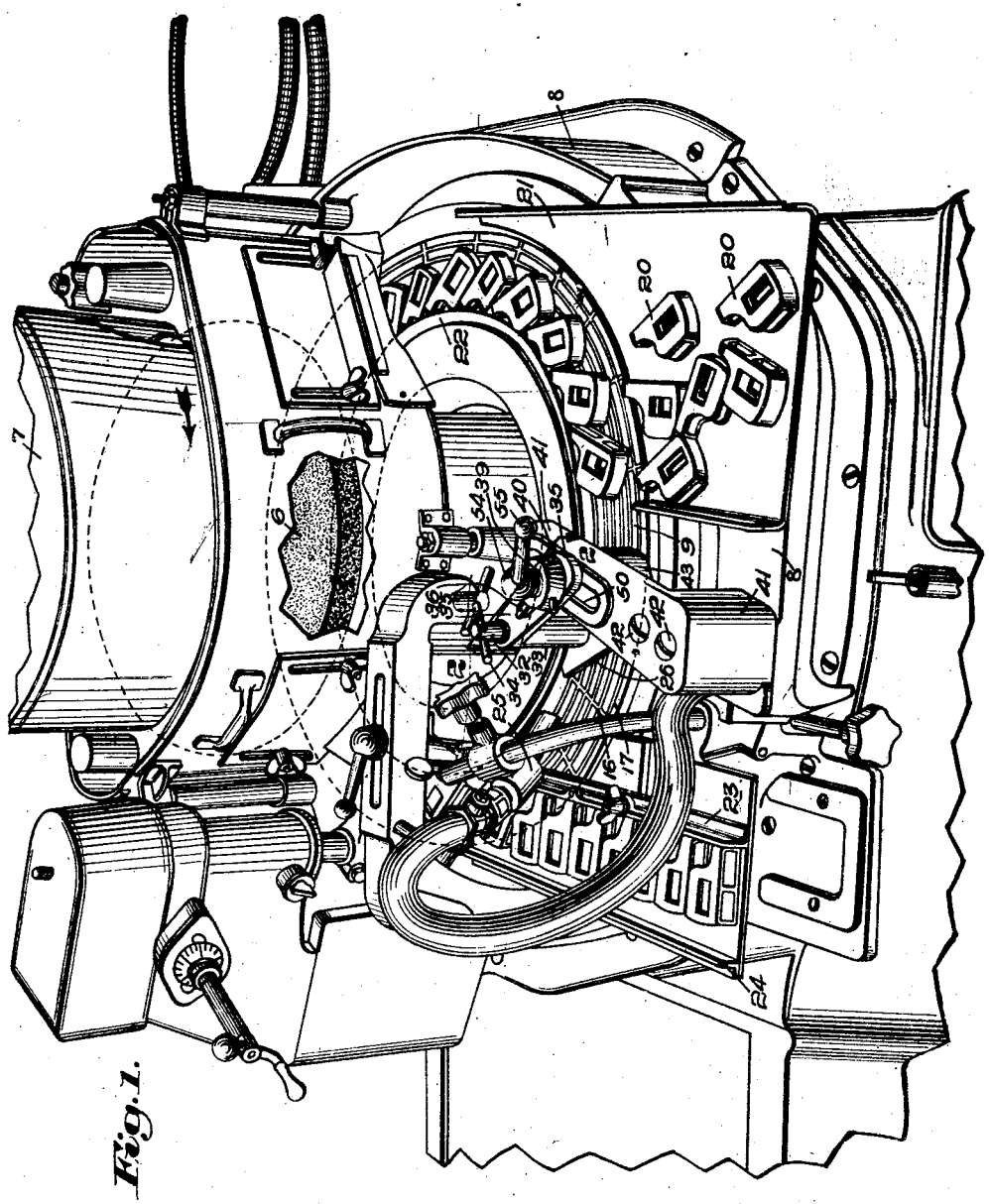
Fig. 1 is a perspective view of a vertical spindle surface-grinding machine exemplifying the invention.

Referring to the drawings, and to the embodiment of the invention which is selected for exemplification, there is shown (see Fig. 1) a metal working tool, specifically a vertical surface grinder, whose general characteristics are similar to that which is the subject matter of U. S. Letters Patent No. 1,182,861, issued May 9th, 1916, to which reference may be had for details not disclosed herein. The machine is provided with an annular grinding wheel 6, mounted on a vertical spindle (not shown) carried by a wheel-head 7, which is mounted to slide vertically on a column (not shown) supported by a base 8.

The articles to be ground are placed on a rotating work support, herein a magnetic chuck 9, which presents an annular chamber 10 (see Fig. 2) for one or more, herein a series, of magnets 11 having windings 12 (see Fig. 5), wound in the same direction, connected to each other in series, and receiving current from a suitable source 13, the terminals of which are connected to the coils by lead wires 14 and 15. The area of the chuck face served by these magnets is less than the total area, and herein is a zone of somewhat less than 180 degrees.

To confine the magnetic flux to this zone, the chuck body is suitably slotted and grooved. In the present example, the face of the chuck body is provided with radial grooves filled with non-magnetic strips 16 (see Fig. 1), and annular grooves are filled with non-magnetic rings 17. These annular grooves divide the face of the chuck body into a multiplicity of small pole pieces, after the manner of the chuck which is the subject matter of U. S. Letters Patent No. 1,125,198, issued January 19th, 1915.

While the chuck body is mounted to rotate, the magnets in the present example are fixed, and the influence of the magnets extends practically to only the chuck body segments with which they are associated at a given instant. In other words, the magnetic zone is substantially confined to the area which is adjacent the magnets. To ensure prompt demagnetization and release of the work pieces, and to assist in confining the influence of the magnetizing coils to the desired area, there is provided a releasing magnet 18 (see Fig. 5), having a winding 19 suitably connected in circuit with the source of current, there being provided a rheostat 20 in series with the magnet, for the purpose of varying the effectiveness of the latter. Herein, there is a resistance coil 21 in series with the rheostat and releasing magnet, thereby to permit the use of a small rheostat. To demagnetize particles of magnetic material which might adhere to the face of the chuck, I prefer to provide a second releasing magnet 18′, having a winding 19′, and located about midway between the first and last magnets of the other group.

The articles to be ground, herein exemplified by work pieces 20, are applied to the rotating work support at one point, carried past the grinding wheel, and removed at another point. In the present example, the work pieces are first placed upon a stationary support 21, from which they are fed one by one by hand onto the chuck face. A positioning ring 22, carried by the chuck, predetermines the placing of the work pieces, as regards inward movement. Soon after the work pieces have been placed upon the chuck face, they pass into the magnetic zone, and are securely held during the grinding operation, after which they pass out of the magnetic zone, and are conveniently removed from the chuck face automatically by appropriate means, such as a guide 23, which extends across the chuck face to a point closely adjacent to the ring 22. Another guide 24 is associated with the guide 23, and generally parallel therewith, and assists in guiding the pieces to their destination.

To ensure accurate placing of the work pieces on the chuck face, preparatory to the grinding operation, it is of course essential that the chuck face, as well as the peripheral surface of the positioning ring 22, shall be freed of detritus, such as particles of metal and abrasive material. To this end, I have provided cleaning means including a nozzle 25, which discharges a cleaning fluid such as water onto the chuck face, thereby removing the bulk of the detritus, after which a scraper, designated generally by the numeral 26 (see Fig. 2), scrapes the chuck face, as well as the periphery of the positioning ring. Herein, this scraper is disposed obliquely with reference to the direction of travel of the work support, thereby utilizing the forward movement of the latter to cause lateral discharge of the foreign matter (see Fig. 1).

The scraper will now be described in detail, reference being had to Figs. 2 and 4. In the present example, the scraper comprises a plurality of generally parallel blades 27 of suitable material, such as hardened steel, appropriately held by a holder 28, as by providing the latter with grooves 29, in which the blades are received. The inner end of the scraper is curved as at 30 to fit the periphery of the positioning ring 22, the blades, as well as the holder, being formed on an arc.

Best results have been obtained by the use of a scraper which yieldingly engages the chuck face, as well as the periphery of the work-positioning ring. Yielding engagement of the scraper with the chuck face is conveniently obtained by allowing the same to gravitate onto the chuck face, and the action of gravity may be assisted by the use of an appropriate yielding means, such as a rubber cushion 31 (see Fig. 2), which may be termed an adjustable presser, it being carried by a holder 32, which is adjustable both horizontally and vertically, thereby to permit the pressure to be applied at any point within reasonable limits and with varying degrees of pressure. This is conveniently accomplished in the present example by making the holder as a vertically-disposed screw, threaded into a nut presented by a vertical guide 33, in which it may be adjusted vertically by rotation in the proper direction, it being provided for this purpose with a handle 34, best shown in Fig. 1. Horizontal adjustability is conveniently accomplished by providing the guide 33 with a horizontal slide 35, having a slot 36 which receives a clamping screw 37 having a head 38, on which the slide rests. A nut 39, threaded onto the screw and preferably provided for convenience with handles 40, serves to clamp the slide in the desired position of adjustment.

The head of the clamping screw is mounted on an appropriate support, herein a bracket 41 which, as best shown in Fig. 3, is secured to the bed 8, as by screws 42. This bracket also affords a support for another slide 43, which presents an abutment 44, against which one edge of the scraper rests, and is maintained in its proper angular relationship with the work-positioning ring. This slide also affords a support for a second yielding presser, herein two rubber cushions 45, which rest against an appropriate abutment, such as an angle bracket 46, suitably secured to the scraper as by screws 47. This cushion maintains a yielding engagement of the scraper with the periphery of the work-positioning ring 22.

In the present embodiment, the slide 43 is adjustably mounted on the bracket 41, as by providing the latter with a longitudinal slot 48, which receives a tongue 49 presented by the slide. The bracket also presents a longitudinal slot 50 for a clamping screw 51, whose lower end is conveniently secured to the slide, as by providing the screw with a reduced portion 52, extending through the slide and riveted, as at 53. The screw extends in an upward direction through the other clamping screw 37, which is in the form of a sleeve, and the screw 51 at its upper end is provided with a clamping nut 54, which for convenience of operation is provided with a handle 55, to avoid the necessity of using a wrench. By rotating this nut in the proper direction, the clamping screw is caused to draw the slide 43 in an upward direction against the bottom of the bracket 41, and on the other hand, to force the head 38 of the other clamping screw 39 down upon the bracket, thereby to clamp both slides in place on the bracket.

Thus it is apparent that I have provided a floating scraper capable of accommodating itself to the chuck face and chuck ring, and automatically maintaining its angle of relationship to the latter. Its weight keeps the scraper flatwise on the chuck face, but gravity is supplemented by the yielding presser. The other presser resists outward movement of the scraper. The scraper support is adjustable in and out for different diameters of work-positioning rings, and serves to prevent the scraper from travelling with the chuck, as well as to maintain the scraper at a definite angle. The top cushion or presser is independently adjustable to bring the pressure to bear at the desired point, usually adjacent the center of the area of contact of the scraper with the chuck face. By the provision of the cushion, such accurate setting of the scraper as would otherwise be necessary is not required. If the rings should happen to be slightly eccentric, the end cushions keep the scraper against the ring, and on the one hand prevent the scraper from scoring the ring, while on the other hand they prevent chips from passing between the end of the scraper and the periphery of the ring. While various materials have been employed for scraper blades, best results have been had with hardened steel, which prevents scoring of the chuck face, probably because the grit does not adhere to and become embedded in the blades.

Having thus described one embodiment of my invention, but without limiting myself thereto, what I claim and desire by Letters Patent to secure is:

1. In a reducing machine of the kind in which the reduction of the work-pieces is effected by a single pass across the reducing tool, the combination of a rotatable work-support on which the work-pieces are placed at one point, carried thence past the reducing tool, and removed at another point, and means for removing the detritus of the work and the reducing tool from the work-support between the point of removal of the finished work-pieces and the point of emplacement of the work-pieces to be reduced.

2. In a reducing machine of the character in which the reduction of the work-pieces is effected by a single pass across the reducing tool, the combination of a rotatable work-support on which the work-pieces are placed at one point, carried thence past the reducing tool, and removed at another point, and a scraper for removing the detritus from the work-support intermediate the point of discharge of the finished work-pieces and the point of application of the work-pieces to be reduced, said scraper yieldingly engaging said work-support.

3. In a reducing machine of the character in which the reduction of the work-pieces is effected by a single pass across the reducing tool, the combination of a rotatable work-support on which the work-pieces are placed at one point, carried thence past the reducing tool, and removed at another point, and a scraper for removing the detritus from the work support intermediate the point of discharge of the finished work-pieces and the point of application of the work-pieces to be reduced, said scraper gravitating into engagement with said work-support.

4. In a reducing machine of the kind in which the reduction of the work-pieces is effected by a single pass across the reducing tool, the combination of a rotatable work-support on which the work-pieces are placed at one point, carried thence past the reducing tool and removed at another point, said work support presenting two surfaces, one transverse to the other, and means for causing the removal of the detritus from the work-support between the point of application of the work-pieces and the point of removal therefrom, said means including a scraper yieldingly mounted with reference to both of said surfaces.

5. In a metal working tool, the combination of a travelling work-support, a scraper contacting therewith, and means to prevent said scraper from travelling with said work-support and to permit said scraper to gravitate thereonto.

6. In a metal working tool, the combination of a travelling work-support, a scraper contacting therewith, means to prevent said scraper from travelling with said work-support, and means to maintain yielding engagement of said scraper with said work support.

7. In a metal working tool, the combination of a travelling work-support, a scraper contacting therewith, and means to maintain a definite angular relationship of said scraper with respect to the direction of travel of said work-support.

8. In a metal working tool, the combination of a travelling work-support, a scraper contacting therewith, and means to maintain a definite angular relationship of said scraper with respect to the direction of travel of said work-support, and to utilize gravitation to maintain said scraper in contact with said work-support.

9. In a metal working tool, the combination of a travelling work-support, a scraper gravitating into contact therewith, and an abutment which maintains a definite angular relationship of said scraper with respect to the direction of travel of said work-support and prevents said scraper from travelling with said work-support.

10. In a metal working tool, the combination of a travelling work-support presenting two surfaces against which the work is positioned, a scraper contacting with said surfaces, and means to cause the maintenance of a yielding engagement of said scraper with both of said surfaces.

11. In a metal working tool, the combination of a travelling work-support presenting two surfaces against which the work is positioned, a scraper contacting with said surfaces, and means to cause the maintenance of a resilient engagement of said scraper with both of said surfaces.

12. In a metal working tool, the combination of a travelling work-support presenting two surfaces against which the work is positioned, a scraper contacting with said surfaces, means to maintain a definite angular relationship of said scraper with respect to the direction of travel of said work-support and to prevent said scraper from travelling with said work-support, and means to cause the maintenance of a yielding engagement of said scraper with said surfaces.

13. In a metal working tool, the combination of a travelling work-support, a scraper contacting therewith, and means for applying a yielding pressure against said scraper toward said work-support.

14. In a metal working tool, the combination of a travelling work-support having two surfaces for the positioning of the work, and means for applying a yielding pressure against said scraper toward said surfaces.

15. In a metal working tool, the combination of a travelling work-support, a scraper contacting therewith, and adjustable means for applying an adjustable yielding pressure against said scraper toward said work-support.

16. In a metal working tool, the combination of a travelling work-support having two surfaces for the positioning of the work, adjustable means for applying an adjustable yielding pressure against said scraper toward one of said surfaces, and adjustable means for applying an adjustable yielding pressure against said scraper toward the other of said surfaces.

17. In a metal working tool, the combination of a travelling work-support, a scraper contacting therewith, and adjustable means to maintain engagement of said scraper with said work-support.

18. In a metal working tool, the combination of a travelling work-support having two surfaces for the positioning of the work, adjustable means to maintain engagement of said scraper with one of said surfaces and adjustable means to maintain engagement of said scraper with the other of said surfaces.

19. In a metal working tool, the combination of a travelling work-support, a scraper contacting therewith, and adjustable means for applying a yielding pressure against said scraper at the desired point.

20. In a metal working tool, the combination of a travelling work-support, and a floating scraper contacting therewith.

21. In a metal working tool, the combination of a rotating work-support, means for causing work to be held thereon within a certain zone of the rotation, means for removing metal from the work while so held, and a scraper contacting with said work-support in another zone following the removal of the work.

22. In a metal working tool, the combination of a rotating work-support presenting a flat surface to support the work and a peripheral surface to position the work, and a scraper contacting with said peripheral and flat surfaces and disposed oblique to the direction of travel of said work support.

23. In a metal working tool, the combination of a rotating work-support presenting a flat surface to support the work and a peripheral surface to position the work, and a scraper having a plurality of blades contacting with said peripheral and flat surfaces and disposed oblique to the direction of travel of said work-support.

24. In a metal working tool, the combination of a travelling work-carrier, a scraper contacting therewith and supported thereby, a support above said carrier, and means supported by said support to prevent said scraper from travelling with said work-support, said scraper being free to move vertically with reference to said support.

25. In a metal working tool, the combination of a travelling work-carrier, a scraper contacting therewith and supported thereby, a support above said carrier, and means supported by said support to prevent said scraper from travelling with said work-support and to cause the maintenance of a definite angular relationship of said scraper with respect to the direction of travel of said work-carrier while permitting said scraper to move vertically.

26. In a metal working tool, the combination of a travelling work-carrier, a scraper contacting therewith, a support above said carrier, and angularly adjustable means supported by said support to prevent said scraper from travelling with said work-support.

27. In a metal working tool, the combination of a travelling work-carrier, a scraper contacting therewith, a support above said carrier, presser means for causing said scraper yieldingly to engage said work-carrier, and means providing for adjustment of said presser means toward said work-carrier and transversely of the direction of travel of said work-carrier.

28. In a vertical spindle surface grinding machine, the combination of a base, a rotatable magnetic chuck having means for causing the creation of a magnetic zone including a part only of said chuck and having a work-positioning peripheral surface, a grinding wheel for grinding the work within said zone, a scraper having a plurality of blades contacting with said chuck and with said peripheral surface without said zone and disposed obliquely with relation to the travel of said chuck, a cushion resisting upward movement of said scraper, a cushion resisting outward movement of said scraper with relation to said peripheral surface, and supporting means adjustably to support said cushions and including a vertically disposed screw-threaded holder for the first-mentioned cushion, a horizontal slide having a horizontal slot and a vertical guide presenting a nut for said holder, a vertical, screw-threaded sleeve received in said slot and presenting a head below said slide, a nut threaded onto said sleeve above said slide and clamping said slide to said sleeve, a bracket supporting said sleeve and presenting a horizontal slot, a second slide below said bracket, carrying the second-mentioned cushion and presenting an abutment which prevents said scraper from travelling with said chuck and maintains its angular relationship therewith, a vertically disposed clamping screw attached to said second slide, extending in an upward direction through said slot in said bracket and through said sleeve, and a nut threaded onto said clamping screw to clamp said second slide to said sleeve and to said bracket.

In testimony whereof, I have signed my name to this specification.

HAROLD F. SKILLINGS.